United States Patent
Hara et al.

(10) Patent No.: US 6,960,400 B2
(45) Date of Patent: Nov. 1, 2005

(54) FUEL CELL POWER GENERATION SYSTEM AND CONTROL METHOD THEREOF

(75) Inventors: Koichiro Hara, Toyota (JP); Nobuki Hattori, Toyota (JP); Osamu Nakanishi, Obu (JP); Shiroh Yamasaki, Toyoake (JP)

(73) Assignees: Toyota Jidosha Kabushiki Kaisha, Toyota (JP); Aisin Seiki Kabushiki Kaisha, Kariya (JP)

(*) Notice: Subject to any disclaimer, the term of this patent is extended or adjusted under 35 U.S.C. 154(b) by 279 days.

(21) Appl. No.: 10/326,275

(22) Filed: Dec. 23, 2002

(65) Prior Publication Data

US 2003/0124400 A1    Jul. 3, 2003

(30) Foreign Application Priority Data

Dec. 26, 2001 (JP) ......................................... 2001-393934

(51) Int. Cl.[7] .............................................. H01M 8/00
(52) U.S. Cl. ............................... 429/12; 429/13; 429/17
(58) Field of Search ............................. 429/12, 13, 17

(56) References Cited

U.S. PATENT DOCUMENTS 5,885,727 A * 3/1999 Kawatsu ..................... 429/17

FOREIGN PATENT DOCUMENTS

| EP | 972668 A2 | * 1/2000 | ........... B60L/11/18 |
| JP | 6-295735 A | 10/1994 | |
| JP | 6-295735 | * 10/1994 | ........... H01M/8/04 |
| JP | 8-236134 A | 9/1996 | |

* cited by examiner

Primary Examiner—Dah-Wei Yuan
(74) Attorney, Agent, or Firm—Kenyon & Kenyon

(57) ABSTRACT

When power failure of a commercial power source is detected, an inverter interrupts power supply to a power line extending between the commercial power source and a load via a circuit breaker. Then the control mode of a load DC—DC converter is changed to a constant voltage control to maintain stable operation of a fuel cell. This allows the accessory DC—DC converter to supply power to accessories used for operating the fuel cell power generation system. Also, the quantity of city gas to be supplied to a reformer is changed to a quantity necessary for the fuel cell to generate power for driving the accessories. This makes it possible to avoid excessive production of hydrogen, thus improving energy efficiency of the fuel cell power generation system.

24 Claims, 4 Drawing Sheets

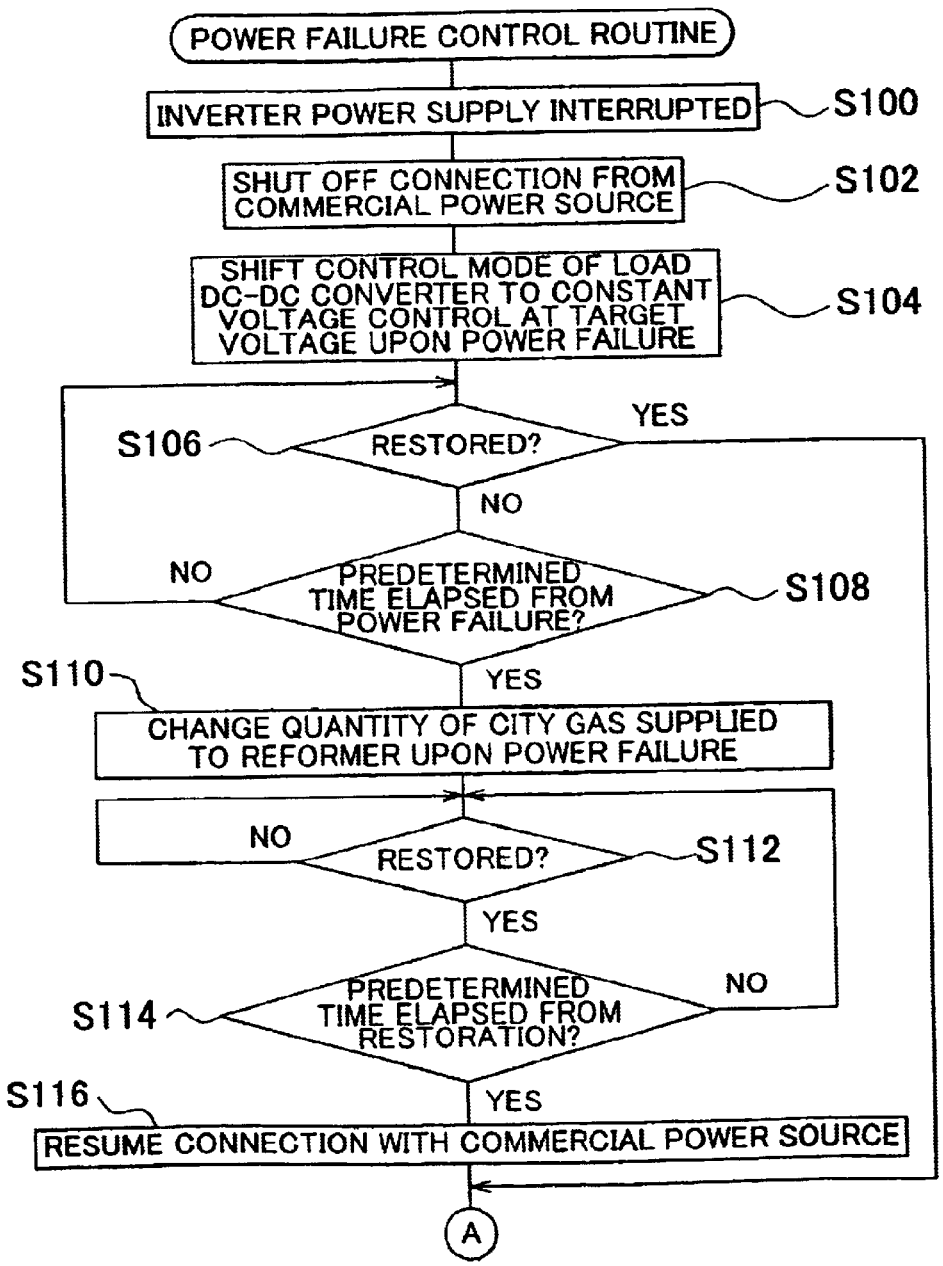

Continuation

FUEL CELL POWER GENERATION SYSTEM AND CONTROL METHOD THEREOF

INCORPORATION BY REFERENCE

This disclosure of Japanese Patent Application No. 2001-393934 filed on Dec. 26, 2001 including the specification, drawings and abstract is incorporated herein by reference in its entirety.

BACKGROUND OF THE INVENTION

1. Field of Invention

The invention relates to a fuel cell power generation system and a control method thereof.

2. Description of Related Art

There is a fuel cell power generation system disclosed in Japanese Laid-Open Patent Publication No. 6-295735, in which the power source of accessories that operate using commercial power in normal state is switched from a commercial power supply to a fuel cell upon detection of a failure in commercial power. In this system, power is supplied to accessories which are used for operating the fuel cell power generation system from the commercial power supply upon start-up. When the output of the fuel cell reaches a rated level, the power source of some of the accessories is switched to the fuel cell from the commercial power supply. With this system, upon detection of the power failure of the commercial power supply, the power source of those accessories powered by the commercial power (i.e. the accessories not already switched to the fuel cell) is switched to the fuel cell so as to cope with the power failure.

The aforementioned fuel cell power generation system, however, does not perform a control for supplying power in accordance with the power required by the accessories from the fuel cell in case of power failure which is typically lower than the power required in the absence of a power failure. Therefore, the fuel cell is unnecessarily operated and consumes an excessive amount of fuel, resulting in reduced efficiency of the system. Even if the fuel cell is brought into an operating state at the rated output, the commercial power source is still used to supply power to some of the accessories. Accordingly, in case of power failure in the commercial power source, the power source to some of the accessories has to be switched to the fuel cell so as to cope with the power failure.

SUMMARY OF THE INVENTION

It is an object of the invention to provide a fuel cell power generation system and a control method thereof for improving the energy efficiency of the fuel cell power generation system upon power failure of another power source. It is another object of the invention to drive the accessories without switching between the fuel cell and the other power source even in the power failure in the other power source.

According to an embodiment of the invention, a fuel cell power generation system includes a fuel cell that serves as a first power source for generating power upon receipt of fuel supply, a direct-current adjusting unit capable of adjusting a direct current generated by the fuel cell into a direct current controlled at one of a target voltage, a target current, and a target power, a first power supply unit that supplies power to a power line extending between a second power source and a load using the adjusted direct current, a second power supply unit that supplies a predetermined direct current power to an accessory that is driven by the predetermined direct current power using the adjusted direct current output, a power failure detecting unit that detects power failure of the second power source, and a controller. The controller of the fuel cell power generation system controls the direct-current adjusting unit such that the direct current generated by the fuel cell is adjusted to the direct current controlled at one of the target voltage, target current and target power on the basis of a required load when the power failure detecting unit has not detected a power failure of the second power source. The controller further controls the direct-current adjusting unit such that the direct current generated by the fuel cell is adjusted to a value corresponding to a direct current at the target voltage established for the power failure when the power failure of the second power source is detected by the power failure detecting unit.

In the state where the power failure is not detected in the other power source, that is, in the normal state, the fuel cell power generation system of the invention is constructed such that the DC output of the fuel cell is adjusted to one of three types of DC outputs set on the basis of the required load, that is, DC output at the target voltage, the target current, and the target power, respectively. In the state where power failure is detected in the other power source, the DC output of the fuel cell is adjusted to the DC output at the target voltage for power failure. Upon the power failure of the other power source, the power supply for accessories serves to supply predetermined value of DC power using predetermined current so as to drive the accessories. Therefore, the accessories can be sufficiently powered without switching the power source even in case of power failure. The term "accessories" represent equipment required for driving the system.

The controller controls the direct-current adjusting unit such that the direct current is adjusted to a value corresponding to a direct current at the target current established on the basis of a required load when the power failure of the second power source is not detected by the power failure detecting unit. With this arrangement, the fuel cell can be operated in further stable state.

The first power supply unit interrupts power supply to the power line when the power failure of the second power source is detected by the power failure detecting unit. The aforementioned system needs to supply power only to the accessories, thus being operable under reduced load.

The controller serves to operate the fuel cell upon receipt of fuel supply with a quantity set for the power failure when the power failure of the second power source is detected by the power failure detecting unit. The aforementioned system is capable of generating a necessary level of power during the power failure, thus improving the energy efficiency of the fuel cell power generation system. If the fuel cell power generation system is arranged to interrupt power supply to the other power source in the power system upon the power failure thereof, the amount of the fuel is adjusted so as to generate power sufficient to drive the accessories. Therefore, the fuel cell can be operated to generate power for driving the accessories.

The controller sets a quantity of the fuel supplied to the fuel cell during the power failure after an elapse of a predetermined time period from detection of the power failure. Accordingly, in the case where power is restored before the elapse of the predetermined time period from detection of the power failure in the other power source, the fuel amount of the fuel does not correspond to the value set for the power failure. As a result, the system can be immediately brought into a normal operating state.

The power failure detecting unit detects restoration of the second power source from the power failure. The controller sets the quantity of the fuel supplied to the fuel cell in accordance with the required load upon detection of the restoration, and operates the fuel cell such that the fuel cell is brought into a normal operating state. The system can be brought into the normal operating state when the other power source is restored. The controller sets the quantity of the fuel supplied to the fuel cell after an elapse of a predetermined time period from detection of the restoration as being in accordance with the required load. The system can be brought into the normal operating state by avoiding a stable state immediately after restoration of the other power source.

The fuel cell power generation system is further provided with a reforming portion that reforms a fuel of hydrocarbon type into a hydrogen rich fuel so as to be supplied to the fuel cell. Accordingly hydrocarbon fuel may be used for power generation.

The controller changes a quantity of the fuel of hydrocarbon type supplied to the reforming portion so as to change the quantity of the fuel to be supplied to the fuel cell by changing the quantity of the fuel supplied to the fuel cell. In the system, the quantity of hydrocarbon fuel to be supplied to the fuel cell is adjusted to the value set for the power failure.

The fuel of hydrocarbon type may be one of city gas and propane gas. Thus, the fuel cell power generation system is made suitable to be installed and used for household utility.

The fuel cell power generation system is further provided with a water tank that stores water heated at least by the fuel cell. In the system, heat generated by the fuel cell may be used for improving energy efficiency in the system. It is possible to use heat generated by a device other than the fuel cell.

An embodiment of the invention provides a control method of a fuel cell power generation system including a fuel cell that serves as a first power source for generating power upon receipt of fuel supply, a direct-current adjusting unit capable of adjusting a direct current generated by the fuel cell into a direct current controlled at one of a target voltage, a target current, and a target power, a first power supply unit capable of supplying power to a power line extending between a second power source and a load using the adjusted direct current output, and a second power supply unit that supplies a predetermined direct current power to an accessory that is driven by the predetermined power using the adjusted direct current output. The method includes (a) controlling the direct-current adjusting unit such that the direct current generated by the fuel cell is adjusted to the direct current controlled at one of the target voltage, target current and target power on the basis of a required load when power failure of the second power source is not detected; and (b) controlling the direct-current adjusting unit such that the direct current generated by the fuel cell is adjusted to a value corresponding to a direct current at a target voltage established for the power failure when the power failure of the second power source is detected.

In the state where the power failure is not detected in the other power source, that is, in the normal state, the fuel cell power generation system of the invention is constructed such that the DC output of the fuel cell is adjusted to one of three types of DC outputs set on the basis of the required load, that is, DC output at the target voltage, the target current, and the target power, respectively. In the state where power failure is detected in the other power source, the DC output of the fuel cell is adjusted to the DC output at the target voltage for power failure. Upon the power failure of the other power source, the power supply for accessories serves to supply predetermined value of DC power using predetermined current so as to drive the accessories. Therefore, the accessories can be sufficiently powered without switching the power source even in case of power failure. The term "accessories" represent equipment required for driving the system.

The direct-current adjusting unit is controlled such that the direct current is adjusted to a value corresponding to a direct current at the target current established on the basis of a required load when the power failure of the second power source is not detected by the power failure detecting unit. In this system, the fuel cell can be operated with improved stability in a normal state.

The first power supply unit interrupts power supply to the power line when the power failure of the second power source is detected. The aforementioned system needs to supply power only to the accessories, thus being operable under reduced load.

The fuel cell is operated upon receipt of fuel supply with a quantity set for the power failure when the power failure of the second power source is detected. The aforementioned system is capable of generating a necessary level of power during a power failure, thus improving the energy efficiency of the fuel cell power generation system. If the fuel cell power generation system is arranged to suspend power supply to the other power source in the power system upon power failure thereof, the amount of the fuel is adjusted so as to generate power sufficient to drive the accessories. Therefore, the fuel cell can be operated to generate power for driving the accessories.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
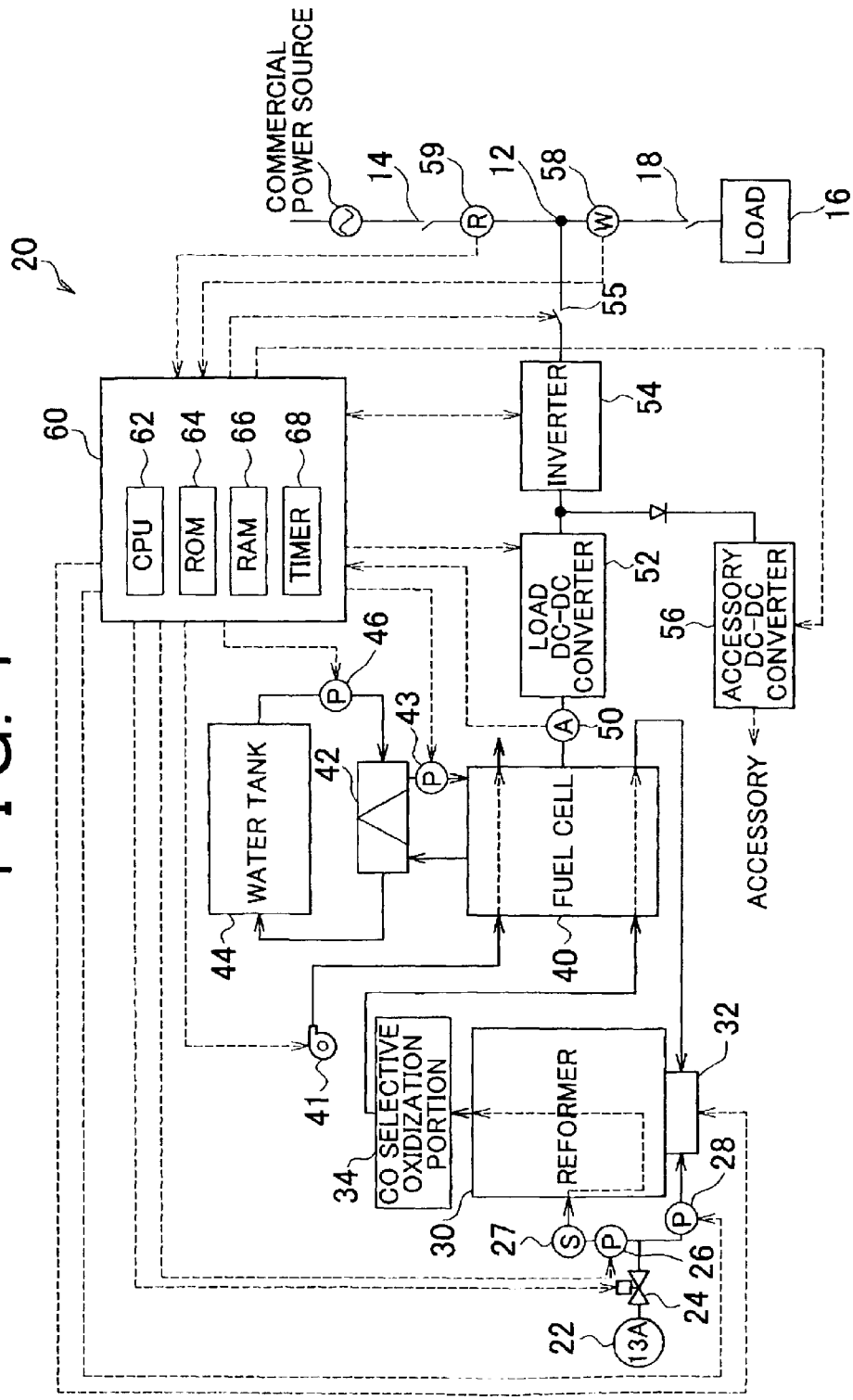
FIG. 1 is a schematic view showing a construction of a fuel cell power generation system according to one embodiment of the invention.

Hereinafter, the invention will be described with reference to a preferred embodiment. FIG. 1 is a schematic view of a fuel cell power generation system 20 according to one embodiment of the invention. As shown in FIG. 1, a fuel cell power generation system 20 includes a reformer 30, a CO selective oxidization portion 34, a fuel cell 40, a heat exchanger 42, a load DC—DC converter 52, an inverter 54, an accessory DC—DC converter 56, a load power meter 58, a power failure detector 59, and an ECU (Electronic Control Unit) 60. The reformer 30 converts city gas (13A) supplied from a gas pipe 22 into hydrogen-rich reformate gas. The CO selective oxidization portion 34 converts the reformate gas into fuel gas by reducing the carbon monoxide in the reformate gas. The fuel cell 40 is supplied with the fuel gas and air, and generates power through electrochemical reactions. The heat exchanger 42 is operable to exchange heat between coolant of the fuel cell 40 and low temperature water from a hot water tank 44. The load DC—DC converter 52 is operable to adjust voltage and current of direct current (DC) power supplied from the fuel cell 40 so as to produce a desired DC output. The inverter 54 converts the DC output of the load DC—DC converter 52 into alternating current (AC) power of the same phase as a commercial power source 10, and supplies the resultant AC power to a power line 12 via a circuit breaker 55, through which power is supplied from the commercial power source 10 to a load 16 via a circuit breaker 14. The accessory DC—DC converter 56 is operable as a power source for accessories by reducing the voltage of the DC output at adjusted voltage or current as described above. The load power meter 58 is used to detect the power consumed by the load 16. The power failure detector 59 is used to detect a power failure of the commercial power source 10. The ECU 60 is arranged to perform an overall control of the fuel cell power generation system 20.

The reformer 30 is supplied with city gas from the gas pipe 22 via an adjustment valve 24, a pressure increase pump 26 and a desulfurizer 27 for reducing the sulfur contents, and is also supplied with water vapor from a pipe (not shown). The reformer 30 is adapted to produce hydrogen-rich reformate gas by causing a water reforming reaction represented by the following expression (1) and a water shift reaction represented by the following expression (2) between the supplied city gas and water vapor. The reformer 30 is provided with a combustor 32 for generating heat required for causing the reactions. The combustor 32 is supplied with city gas from the gas pipe 22 via the adjustment valve 24 and another pressurizing pump 28. The exhaust gas from an anode side of the fuel cell 40 is also supplied to the combustor 32 in order to use unreacted hydrogen contained in the anode-off gas as fuel.

$$CH_4 + H_2O \rightarrow CO + 3H_2 \tag{1}$$

$$CO + H_2O \rightarrow CO_2 + H_2 \tag{2}$$

The CO selective oxidization portion 34 is supplied with air from a pipe (not shown) and converts the reformate gas into hydrogen-rich fuel gas having an extremely low concentration of carbon monoxide (approximately several ppm in the embodiment) by selectively oxidizing carbon monoxide contained in the reformate gas through a carbon monoxide selective oxidization catalyst. The catalyst is made of, for example, an alloy of platinum and ruthenium and has a property of selectively oxidizing carbon monoxide in the presence of hydrogen.

The fuel cell 40 is structured as a polymer electrolyte fuel cell including a plurality of single cells stacked therein. Each cell includes an electrolyte membrane, anode and cathode electrodes sandwiching the electrolyte membrane, and separators each of which serves as a partition between the cells and supplies the fuel gas and air to the anode or cathode electrode. With the fuel cell 40 thus constructed, power is generated thorough electrochemical reactions between hydrogen in the fuel gas supplied from the CO selective oxidization portion 34 and oxygen in the air supplied from a blower 41. Also, a coolant passage is formed in the fuel cell 40, through which the coolant is circulated in the fuel cell 40 to maintain its temperature to an appropriate value (approximately 80 to 90° C. in the embodiment). A heat exchanger 42 is arranged at a point in the coolant passage to carry out heat exchanged between the coolant of the fuel cell 40 and the low temperature water delivered from the hot water tank 44 by a pump 46. The low temperature water heated as a result of heat exchange is stored in the hot water tank 44.

An output terminal (not shown) of the fuel cell 40 is connected to the power line 12 connecting the commercial power source 10 and the load 16, through the load DC—DC converter 52, the inverter 54 and the circuit breaker 55. With this arrangement, the DC power supplied from the fuel cell 40 is converted into AC power at the same phase as that of the power supplied from the commercial power source 10. The resultant AC power is then fed to the AC power of the commercial power source 10, thus being supplied to the load 16. As constructions of the load DC—DC converter 52 and the inverter 54 may be the same as those generally used, the explanation of those devices will be omitted. Meanwhile, the load 16 is connected to the power line 12 via a circuit breaker 18.

A power line branched from an output line of the load DC—DC converter 52 is connected to the accessory DC—DC converter 56 serving as a DC power supply that feeds DC power to the accessories used for operating the fuel cell power generation system 20, for example, an actuator of the adjustment valve 24, the pressurizing pumps 26, 28, the blower 41 and the pump 46.

The ECU 60 is constructed as a microprocessor including a CPU 62 as its central component, a ROM 64 for storing control programs, a RAM 66 for temporarily recording data, input/output ports (not shown), and a communication port (not shown). The ECU 60 receives, through the input port, signals indicative of values such as a terminal voltage V detected by a voltage sensor 51 disposed on the output terminal of the fuel cell 40, output current and voltage detected by current and voltage sensors arranged in the inverter 54 (both not shown), load power consumption Po detected by the load power meter 58 and temperatures detected by temperature sensors (not shown) respectively disposed in the reformer 30, the CO selective oxidization portion 34 and the fuel cell 40. The ECU 60 also receives a power failure detection signal from the power failure detector 59. In return, the ECU 60 outputs, through the output port, various signals such as drive signals to the actuator of the adjustment valve 24, the pressure increase pumps 26, 28, the blower 41, a circulating pump 43 and the pump 46, an ignition signal to the combustor 32, control signals to the load DC—DC converter 52 and the accessory DC—DC converter 56, a switching signal sent to the inverter 54 and a drive signal sent to the circuit breaker 55.

Figure 2:
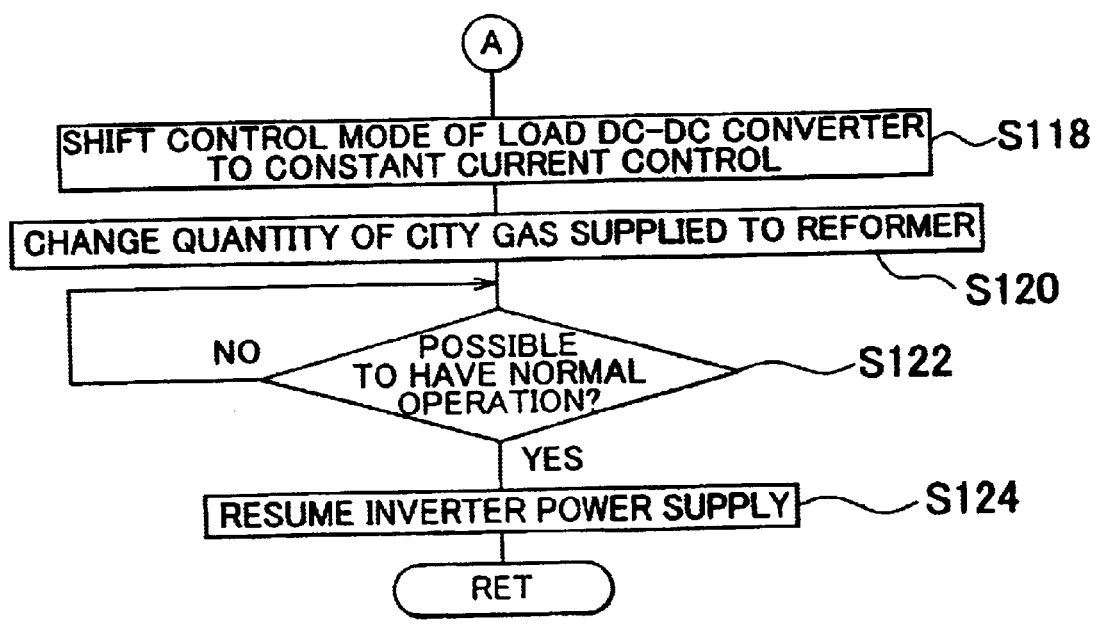
FIG. 2 is a flowchart showing one example of a power failure procedure control routine to be executed by an electronic control unit in the event of a power failure of commercial power supply.

Next, the operation of the fuel cell power generation system 20 constructed as described above, especially its operation performed during a power failure of the commercial power source 10 will be described. FIG. 2 is a flowchart showing one example of a power failure control routine to be executed by the ECU 60 upon detection of a power failure of the commercial power source 10 by the power failure detector 59.

At start of the control routine in step S100, power supply from the inverter 54 to the power line 12 is interrupted. Then in step S102, the circuit breaker 55 is operated to shut off connection between the inverter 54 and the side of the commercial power source 10. The process proceeds to step S104, in which the control mode of the load DC—DC converter 52 is switched to a constant voltage control to maintain its output voltage to a target voltage for power failure. In the embodiment of the invention, the target voltage for power failure is set to a value corresponding to the normally generated voltage at the output side of the load DC—DC converter 52. In a normal state, that is, no power failure at the commercial power source 10 is detected, the load DC—DC converter 52 is generally subjected to a constant current control on the basis of the target current suitable for the operation mode set in accordance with the power consumed by the load 16. As a result, the voltage at the output side is not kept constant. The target current is set to the value in accordance with the operation mode selected among three modes, that is, High mode under high load, Mid mode under intermediate load, and Low mode under low load, by the operation mode setting routine (not shown). As described above, constant voltage control of the load DC—DC converter 52 makes it possible to supply sufficient power to the accessories with stability that receive power supplied through the accessory DC—DC converter 56.

When the control of the load DC—DC converter 52 is switched to the constant voltage control in step S104, the process proceeds to step S106 where it is determined whether the commercial power source 10 has been restored within a predetermined time period from detection of the power failure. If NO is obtained in step S106, that is, it is determined whether the commercial power source 10 has not been restored yet, the process proceeds to step S108 where it is determined whether the predetermined time period has been elapsed from the detection of the power failure.

When YES is obtained in step S108, that is, the predetermined time period has been elapsed, and the commercial power source 10 has not been restored yet, the process proceeds to step S110. In step S110, the supply quantity of city gas to be reformed in the reformer 30 and to be combusted in the combustor 32 is changed to a predetermined value of the supply quantity during the power failure (hereinafter referred to as the power failure supply quantity). The process proceeds to step S112 where it is determined whether the commercial power source has been restored in the aforementioned operating state. Meanwhile, the power failure supply quantity of city gas is set to a quantity with which the reformer 30 can produce necessary quantity of fuel gas for the fuel cell 40 to generate sufficient power for driving accessories of the fuel cell power generation system 20. The quantity of city gas supplied to the reformer 30 is changed to the power failure supply quantity so as to prevent excessive production and combustion of the fuel gas, that is, hydrogen, thus improving the system efficiency.

When YES is obtained in S112, that is, the commercial power source 10 has been restored, the process proceeds to step S114 where it is determined whether the predetermined time period has been elapsed from the restoration. If YES is obtained in S114, that is, the predetermined time period has been elapsed, the process proceeds to step S116 where the circuit breaker 55 is operated to resume connection to the side of the commercial power source 10. The predetermined time period elapsing from the restoration of the commercial power source 10 is set so as to bring the commercial power source 10 into a stable state for starting power supply to the load 16 in the stable state.

If the commercial power source 10 is restored within the predetermined time period after resumption of connection to the commercial power source 10 or detection of power failure thereof, the control mode of the load DC—DC converter 52 is switched from the constant voltage control at the target voltage during power failure to the constant current control in step S118. Then the process proceeds to step S120 where the quantity of city gas supplied to the reformer 30 is gradually changed to the value corresponding to the operation mode established on the basis of the power consumed by the load 16. Then the process proceeds to step S122 where it is determined whether the system has been returned to the normal operating state. When YES is obtained in step S122, the process proceeds to step S124 where power supply from the inverter 54 to the power line 12 is started. The routine, therefore, ends.

Figure 3:
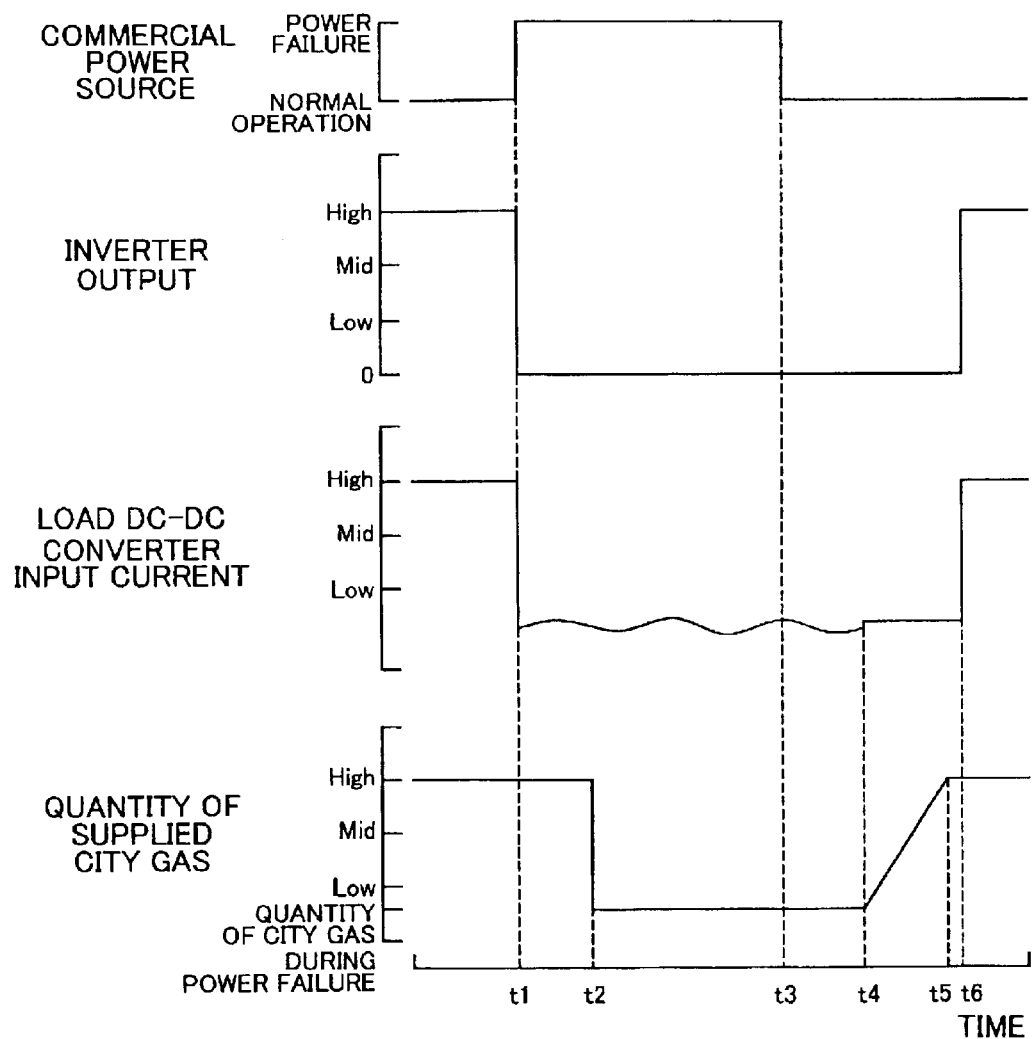
FIG. 3 is a time chart representing an example of each change in control amounts of a DC—DC converter for a load, an inverter, and supply quantity of gas with respect to the axis of time from power failure in the commercial power source to restoration.

FIG. 3 is a time chart showing each change in operation states of the load DC—DC converter 52 and the inverter 54, and the supply amount of the city gas from the power failure to restoration of the commercial power source 10. Referring to FIG. 3, in the fuel cell power generation system 20 operated at High operating mode, the commercial power source 10 is in a normal state. Accordingly the load DC—DC converter 52 is subjected to the constant current control in accordance with the current value corresponding to the High mode. The output of the inverter 54, thus, corresponds to the High mode so as to supply AC power to the power line 12. Referring to the flowchart of FIGS. 2 and 3, when power failure of the commercial power source 10 is detected by a power failure detector 59 at a time point t1, the output of the inverter 54 is immediately stopped in step S100. Then in step S102, connection to the commercial power source 10 is interrupted by the circuit breaker 55 in step S102. Then in step S104, the control mode of the load DC—DC converter 52 that has been subjected to the constant current control has been switched to the constant voltage control. Therefore, the input current of the load DC—DC converter 52 varies with the driving state of the accessory so as to supply power to the accessories with improved stability via the accessory DC—DC converter 56. As it is assumed that the commercial power source 10 can be recovered from the power failure within a substantially short time period, no procedure for coping with the power failure is conducted to the reformer 30 with low response at the time point t1.

At a time point t2 elapsing from the time point t1 when power failure is detected, it is determined that the power failure of the commercial power source 10 further continues. Then in step S110, the supply quantity of city gas to the reformer 30 is changed to the power failure supply. By adjusting the quantity of the city gas supplied to the reformer 30, the reformer 30 does not have to reform excessive quantity of the gas. Therefore, the efficiency of the aforementioned system may be improved compared with the system in which the quantity of city gas supplied to the reformer 30 is not changed. The excess amount of the city gas supplied to the reformer 30 is combusted in the combustor 32 until the quantity of the city gas supplied to the reformer 30 is changed.

In the fuel cell power generation system 20, even if restoration of the commercial power source 10 is detected by the power failure detector 59 at a time point t3, the system 20 is kept operated at the mode for the power failure for a predetermined time period taken for the commercial power source 10 to be brought into a stable state until the time point t4. At the time point t4 at which a predetermined time period has been elapsed from detection of the resumption of the commercial power source 10, interruption of the connection to the commercial power source 10 by the circuit breaker 55 is resumed, and the control mode of the load DC—DC converter 52 is switched to the constant current control in step S116. Then in step S120, the quantity of city gas supplied to the reformer is gradually increased to the value corresponding to the operating mode. When the fuel cell 40 is brought into a constant operating state at a time point t6 when the supply quantity of city gas reaches the value corresponding to the operating mode, the inverter 54 starts supplying power to the power line 12 (step S122, S124). The aforementioned routine, thus, ends.

In the fuel cell power generation system 20 of the embodiment, power supply from the inverter 54 is stopped and the load DC—DC converter 52 is subjected to the constant voltage control upon detection of power failure in the commercial power source 10. This makes it possible to supply power to accessories used for operating the system in a stable state. In case the power failure of the power source 10 continues for a predetermined period of time, the quantity of city gas supplied to the reformer 30 is changed to the power failure supply quantity for enabling the fuel cell power generation system 20 to drive the accessories. The efficiency of the aforementioned system 20, therefore, can be improved compared with that of the system in which the quantity of city gas supplied to the reformer 30 is not changed for driving the accessories.

In the fuel cell power generation system 20 of the embodiment, the load DC—DC converter 52 is subjected to the constant current control when the commercial power source 10 is in a normal state. However, the load DC/DC converter 52 may be subjected to the constant voltage control or constant power control so long as the commercial power source 10 is in the normal state.

In the fuel cell power generation system 20, the quantity of the city gas supplied to the reformer 30 is kept unchanged until the power failure of the commercial power source 10 continues for a predetermined time period. Accordingly, the system may be resumed to the operating state before detection of the power failure upon restoration of the power source within a short period. The fuel cell power generation system 20 is resumed to the normal operating state after the elapse of a predetermined period of time from restoration of the commercial power source 10. This may avoid the system being operated in an unstable state.

In the fuel cell power generation system 20, when the commercial power source 10 is in the normal operating state, the load DC—DC converter 52 is subjected to the constant current control. However, in the aforementioned operating state of the commercial power source 10, the load DC—DC converter 52 may be subjected to the constant voltage control or the constant power control.

In the fuel cell power generation system 20, the quantity of city gas supplied to the reformer 30 is kept unchanged until the power failure in the commercial power source 10 continues for a predetermined period. However, the quantity of city gas supplied to the reformer 30 may be changed to the power failure supply quantity immediately after detection of the power failure in the commercial power source 10. The fuel cell power generation system 20 is resumed to the normal operating state when a predetermined period of time elapses from restoration of the commercial power source 10. However, the system 20 may be resumed to the normal operating state immediately after detection of restoration of the commercial power source 10.

The fuel cell power generation system 20 has the power failure detection device 59 for detecting both power failure and restoration of the commercial power source 10. However, any device may be used so long as it is capable of detecting the power failure and restoration of the commercial power source 10.

The fuel cell power generation system 20 are operated under three modes, that is, High mode, Mid mode, and Low mode. However, the system 20 may be operated under two modes, or four or more modes.

The fuel cell power generation system includes a fuel cell 40 of a solid polymer electrolyte fuel cell. However, the fuel cell is not limited to the aforementioned type, but can be formed into various types.

In the fuel cell power generation system 20, the city gas (13A) is supplied to the reformer 30 so as to produce a hydrogen rich fuel gas. It is possible to supply city gas (12A) or propane gas contained in a gas container to the reformer 30 so as to produce the fuel gas.

With the fuel cell power generation system 20 of the embodiment, as described above, city gas is converted into a hydrogen-rich fuel gas via the reformer 30 and the CO selective oxidization portion 34 and the resultant fuel gas is supplied to the fuel cell 40. However, a hydrogen-rich fuel gas or pure hydrogen contained in a hydrogen tank may alternatively be supplied to the fuel cell 40. In this case, referring to the flowchart of FIG. 2, that is, in step 110, the fuel cell 40 may receive the power failure supply quantity corresponding to the quantity of the fuel gas or pure hydrogen sufficient to generate power required for driving the accessories. The fuel gas supplied to the fuel cell 40 may be directly changed such that the inverter 54 supplies power to the power line 12 immediately after changing the quantity of the fuel gas or pure hydrogen to the value corresponding to the operating mode.

Water is warmed using heat generated by the fuel cell 40 and is thereafter stored in the water container 44 in the fuel cell power generation system 20 of the embodiment. The fuel cell power generation system 20, however, does not have to include such water container 44.

While the invention has been described in detail with reference to preferred embodiments thereof, it is to be understood that the invention is not limited to the preferred embodiments or constructions. To the contrary, the invention is intended to cover various modifications and equivalent arrangements within the scope of the invention.

What is claimed is:

1. A fuel cell power generation system comprising:
a fuel cell that serves as a first power source for generating power upon receipt of fuel supply;
a direct-current adjusting unit capable of adjusting a direct current generated by the fuel cell into a direct current controlled at one of a target voltage, a target current, and a target power;
a first power supply unit that supplies power to a power line extending between a second power source and a load using the adjusted direct current;
a second power supply unit that supplies a predetermined direct current power to an accessory that is driven by the predetermined direct current power using the adjusted direct current output;
a power failure detecting unit that detects power failure of the second power source; and
a controller that controls:
the direct-current adjusting unit such that the direct current generated by the fuel cell is adjusted to the direct current controlled at one of the target voltage, target current and target power on the basis of a required load when the power failure of the second power source is not detected by the power failure detecting unit, and
the direct-current adjusting unit such that the direct current generated by the fuel cell is adjusted to a value corresponding to a direct current at the target voltage established for the power failure when the power failure of the second power source is detected by the power failure detecting unit;

wherein the first power supply unit interrupts the power supply to the power line and the fuel cell performs the power generation based on a power needed to operate the accessory during the power failure of the second power source.

2. A fuel cell power generation system according to claim 1, wherein the controller controls the direct-current adjusting unit such that the direct current is adjusted to a value corresponding to a direct current at the target current established on the basis of a required load when the power failure of the second power source is not detected by the power failure detecting unit.

3. A fuel cell power generation system according to claim 1, wherein the controller serves to operate the fuel cell upon receipt of fuel supply with a quantity set for the power failure when the power failure of the second power source is detected by the power failure detecting unit.

4. A fuel cell power generation system according to claim 3, wherein the controller sets a quantity of the fuel supplied to the fuel cell during the power failure after an elapse of a predetermined time period from detection of the power failure.

5. A fuel cell power generation system according to claim 4, wherein:
the power failure detecting unit detects restoration of the second power source from the power failure; and
the controller sets the quantity of the fuel supplied to the fuel cell in accordance with the required load upon detection of the restoration, and operates the fuel cell such that the fuel cell is brought into a normal operating state.

6. A fuel cell power generation system according to claim 4, wherein the controller sets the quantity of the fuel supplied to the fuel cell in accordance with the required load after an elapse of a predetermined time period from detection of the restoration.

7. A fuel cell power generation system according to claim 1, further comprising a reforming portion that reforms a fuel of hydrocarbon type into a hydrogen rich fuel so as to be supplied to the fuel cell.

8. A fuel cell power generation system according to claim 3, wherein the controller changes a quantity of the hydrocarbon fuel supplied to the reforming portion so as to change the quantity of the fuel to be supplied to the fuel cell by changing the quantity of the fuel supplied to the fuel cell.

9. A fuel cell power generation system according to claim 7, wherein the fuel of hydrocarbon type comprises one of city gas and propane gas.

10. A fuel cell power generation system according to claim 8, wherein the fuel of hydrocarbon type comprises one of city gas and propane gas.

11. A fuel cell power generation system according to claim 1, further comprising a water tank that stores water heated at least by the fuel cell.

12. A control method of a fuel cell power generation system including a fuel cell that serves as a first power source for generating power upon receipt of a fuel supply, a direct-current adjusting unit capable of adjusting a direct current generated by the fuel cell into a direct current controlled at one of a target voltage, a target current, and a target power, a first power supply unit capable of supplying power to a power line extending between a second power source and a load using the adjusted direct current output, and a second power supply unit that supplies a predetermined direct current power to an accessory that is driven by the predetermined power using the adjusted direct current output, the method comprising the steps of:

(a) controlling the direct-current adjusting unit such that the direct current generated by the fuel cell is adjusted to the direct current controlled at one of the target voltage, target current and target power on the basis of a required load when power failure of the second power source is not detected; and (b) controlling the direct-current adjusting unit such that the direct current generated by the fuel cell is adjusted to a value corresponding to a direct current at a target voltage established for the power failure when the power failure of the second power source is detected;
wherein the power supply from the first power supply unit to the power line is interrupted and the power generation of the fuel cell is performed based on a power needed to operate the accessory during the power failure of the second power source.

13. The control method according to claim 12, wherein the direct-current adjusting unit is controlled such that the direct current is adjusted to a value corresponding to a direct current at the target current established on the basis of a required load when the power failure of the second power source is not detected by the power failure detecting unit.

14. The control method according to claim 12, wherein the fuel cell is operated upon receipt of fuel supply with a quantity set for the power failure when the power failure of the second power source is detected.

15. The control method according to claim 13, wherein the fuel cell is operated upon receipt of fuel supply with a quantity set for the power failure when the power failure of the second power source is detected.

16. The control method according to claim 12, wherein the fuel cell is operated upon receipt of fuel supply with a quantity set for the power failure when the power failure of the second power source is detected.

17. A fuel cell power generation system comprising:
a fuel cell that serves as a first power source for generating power upon receipt of fuel supply;
a direct-current adjusting unit capable of adjusting a direct current generated by the fuel cell into a direct current controlled at one of a target voltage, a target current, and a target power
a first power supply unit that supplies power to a power line extending between a second power source and a load using the adjusted direct current;
a second power supply unit that supplies a predetermined direct current power to an accessory that is driven by the predetermined direct current power using the adjusted direct current output;
a power failure detecting unit that detects a power failure of the second power source and a restoration of the power failure; and
a controller that controls;
the direct-current adjusting unit such that the direct current generated by the fuel cell is adjusted to the direct current controlled at one of the target voltage, target current and target power on the basis of a required load when the power failure of the second power source is not detected by the power failure detecting unit; and
the direct-current adjusting unit such that the direct current generated by the fuel cell is adjusted to a value corresponding to a direct current at a target voltage, established for the power failure when the power failure of the second power source is detected by the power failure detecting unit; wherein
the controller sets the quality of the fuel supplied to the fuel cell to a quantity for the power failure when the power failure of the second power source is detected by the power failure detecting unit; and the controller sets the quantity of the fuel supplied to the fuel call in accordance with the required load when restoration of the power failure of the second power source is detected by the power failure detecting unit.

18. A fuel cell power generation system according to claim 17, wherein when the power failure of the second power source is not detected by the power failure detecting unit, the controller performs a constant current control of the direct-current adjusting unit in which the direct current generated by the fuel cell is adjusted to the direct current controlled at the target current on the basis of the required load; and when the power failure of the second power source is detected by the power failure detecting unit, the controller performs a constant voltage control of the direct-current adjusting unit in which the direct current generated by the fuel cell is adjusted to the direct current controlled at the target voltage established for the power failure.

19. A fuel cell power generation system according to claim 17, wherein the controller initiates the required-load-based setting of the quantity of the fuel supplied to the fuel cell a predetermined time period after the restoration of the power failure of the second power source has been detected by the power failure detecting unit.

20. A fuel cell power generation system according to claim 18, wherein the controller shifts from the constant voltage control to the constant current control when the restoration of the power failure of the second power source is detected by the power failure detecting unit.

21. A fuel cell power generation system according to claim 20, wherein the controller makes the shift from the constant voltage control to the constant current control a predetermine time period after the restoration of the power failure of the second power source has been detected by the power failure detecting until.

22. A fuel cell power generation system according to claim 17, further comprising a reforming portion that reforms a hydrocarbon fuel into a hydrogen rich fuel to be supplied to the fuel cell.

23. A fuel cell power generation system according to claim 17, wherein the hydrocarbon fuel is one of city gas and propane gas.

24. A fuel cell power generation system according to claim 17, further comprising a water tank that stores water heated at least by the fuel cell.

* * * * *